May 18, 1965  G. E. HUGGINS  3,184,220

JACK HELPING DEVICE

Filed Sept. 20, 1963

INVENTOR.
GERALD E. HUGGINS
BY Roy A. Plant
ATTORNEY

United States Patent Office 3,184,220
Patented May 18, 1965

3,184,220
JACK HELPING DEVICE
Gerald E. Huggins, Battle Creek, Mich., assignor to
Paul J. Diamante, Battle Creek, Mich.
Filed Sept. 20, 1963, Ser. No. 310,368
7 Claims. (Cl. 254—133)

The present invention relates broadly to lifting equipment, and in its specific phases to a device for supplemental use with an automobile bumper jack to help lift a wheel off from the ground without having to jack the automobile as high as usual.

Automobiles, with their relatively long overhang from the axle, and particularly to the rear end of the automobile, require that a bumper jack be used when there is a flat tire or the like to be replaced. This is not a wholly satisfactory procedure for the simple reason that as the jacking takes place the axle springs relax and allow the wheel to stay on the ground until the bumper jack has been actuated to a very high jacking position. Under these conditions, there is considerable instability of the jacked-up portion of the automobile with the tendency for the jack to tip or the automobile to shift especially when not on pavement or the like. To overcome this high jacking requirement, various relatively complex linkages have been proposed, but apparently they have not proved to be commercially feasible since it appears that they are not available on the open market. It was a recognition of the problem and need involved and the lack of a wholly satisfactory solution for same which led to the conception and development of the present invention.

Accordingly, among the objects of the present invention is the provision of a highly simplified device for use with a conventional bumper jack and which will help to lift an automobile wheel off from the ground without having to jack the automobile as high as is ordinarily necessary.

Another object of this invention is to provide a bumper jack helping device which has a relatively long and rigid axle lifting arm means which can be collapsed to form a smaller package for transportation between times of use.

A further object of the present invention is to provide a bumper jack helper which utilizes a heavy leaf spring as part of same to simultaneously give supplemental automobile axle lifting power while operating a bumper jack in conventional manner.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

FIGURE 1 shows a preferred form of the bumper jack helper of the present invention folded for carrying in the automobile trunk or the like.

Figure 1:
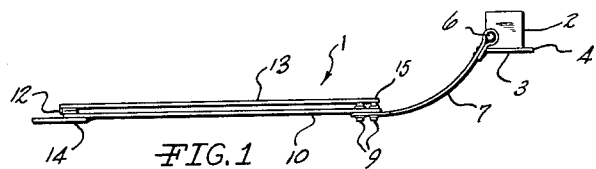
Figure 2:
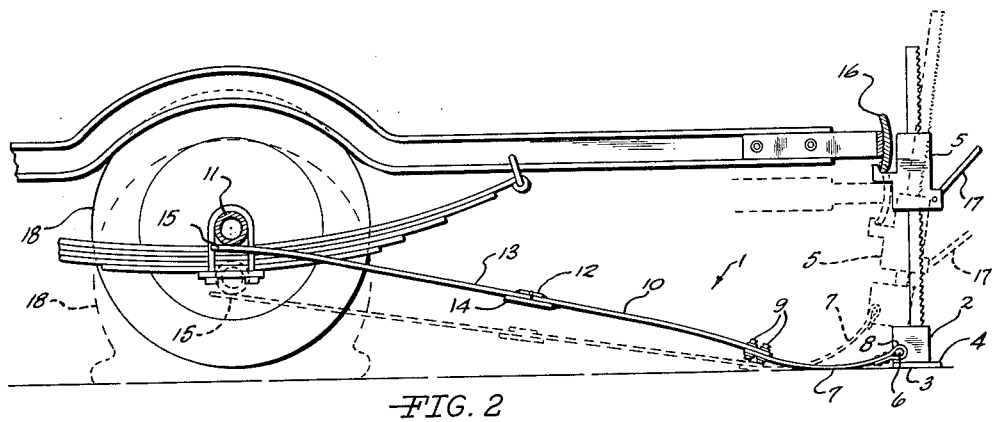
FIGURE 2 is a fragmentary side elevation of an end portion of an automobile with the bumper jack helper of the present invention illustrated in dotted lines in position for starting the application of axle lifting force, and in solid lines with the wheel elevated along with the raising of the end portion of the automobile.
Figure 3:
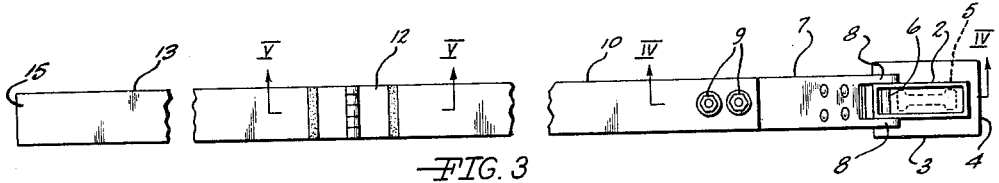
FIGURE 3 is a top view of the bumper jack helper of the present invention with the elongated portion which extends under the axle lying substantially flat on the ground.
Figures 4, 5, 6:
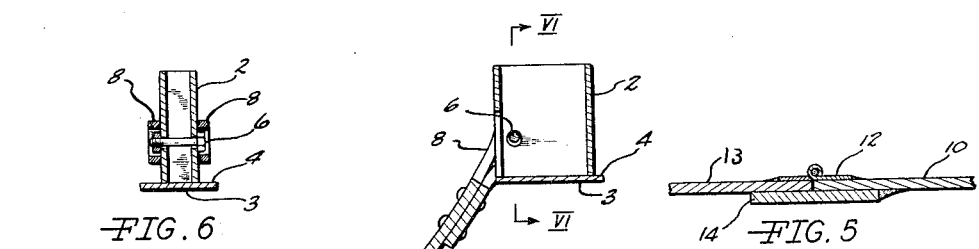
FIGURE 4 shows a fragmentary sectional view of the bumper jack helper as seen along line IV—IV of FIGURE 3, looking in the direction of the arrows.
FIGURE 5 is a fragmentary sectional view of the hinge portion of the bumper jack helper as seen along the line V—V of FIGURE 3, looking in the direction of the arrows.
FIGURE 6 shows a fragmentary sectional view of the bumper jack helper as taken along line VI—VI of FIGURE 4, looking in the direction of the arrows.

Referring more particularly to FIGURES 1 and 2 of the drawing, the bumper jack helper assembly 1 has a bumper jack receiving pocket 2 with an open top and a closed bottom. This closed bottom may be formed by means of a bottom plate 3 which preferably is provided with extending side and rear edge portions 4 to give added ground contact while the rearwardly extending portion further acts as a lever to straighten up the jack receiving pocket 2 when the jacking-up of the automobile gets under way and the bottom plate engages the ground. A conventional bumper jack 5 is shown in FIGURE 2, first in dotted lines in pressure starting position and then in solid lines in final ground-contacting and maximum lifting-pressure position wherein the backwardly extending portion 4 of the bottom plate 3 has aided in getting the jack receiving pocket flat on the ground in suitable position for the normal jacking-up operation.

Pivotally mounted on the front end of the jack receiving pocket 2 by means of a pivot pin 6, of any suitable type, is a relatively stiff leaf spring 7 which is provided with a looped and bifurcated rear end 8 which preferably straddles the sides of the jack receiving pocket as illustrated. This leaf spring 7 is preferably arcuately curved as shown to provide a lifting function when partially or substantially wholly straightened out as will be hereinafter described. The other end of the arcuate leaf spring member may be conventionally anchored as by means of rivets or bolts 9 to the end of a stiff strap iron or steel strip 10 which, if desired, could be long enough to reach all the way to and under the automobile axle 11 and it is intended that same be considered as diagrammatically illustrating same. Preferably, however, due to the length and inconvenience of storing such a long member in an automobile trunk between times of use, the stiff strap iron member 10 is preferably made shorter and provided on its outer end with a hinge 12 conventionally fastened as by welding to the upper side of the end of strap iron member 10 and to a stiff extension strap iron member 13 which, if desired, can be of substantially the same cross section and stiffness as strap iron member 10. This extension member 13 would be long enough so that in use it would extend under and a little way past the bottom of the automobile axle 11. For short overhang vehicles, the assembly can be directly used as shown in FIGURE 1. In order to make the combination of strap iron members 10 and 13 rigid at the hinged connection of same while allowing them to be folded as shown in FIGURE 1, a supporting plate 14 is preferably welded to the underface of either of the strap iron members 10 or 13, for instance, to strap iron member 10 as shown in FIGURE 1.

The bumper jack helper assembly 1 may be folded as shown in FIGURE 1 for convenient carrying in the automobile trunk. Then, in case of a flat tire, such as is shown by dotted lines in FIGURE 2 of the drawing, this bumper jack helper assembly can be removed from the trunk and opened up so that the strap iron member 10 and the extension strap iron member 13 will be substantially in line. The outer end 15 of the extension strap iron member 13 is then passed under the automobile so as to reach and extend under the automobile axle and adjacent the wheel having the flat tire. The bumper jack 5 then has its lower end inserted into the jack receiving pocket 2 of the bumper jack helper assembly and in engagement with the under edge of the automobile bumper 16 and upon actuating the jacking lever 17 the jack receiving pocket will be gradually forced down to the ground while arcuate leaf spring 7 partially straightens out so that the outer end 15 of extension strap iron member 13 starts applying lifting force on the under side of the automobile axle 11. When the jack receiving pocket 2 reaches the ground, the rear extension portion 4 of the bottom plate 3 will first contact the ground, and then jacking through the operation of lever 17 will gradually move the bottom plate 3 of the jack receiving pocket flat onto the ground as shown in heavy lines in FIGURE 2. This will have substantially straightened out the stiff arcuate leaf spring 7 to a point where there is considerable lifting power exerted on the under side of the axle, and as the jacking continues, this lifting power supplements the lifting power of the jack so that the automobile wheel 18 will lift off of the ground with less elevation of the automobile bumper 16 through the operation of the bumper jack 5 than would be the case if there was no lifting power supplied to the under side of the automobile axle 11. The wheel with the flat tire on same can then be removed in conventional manner and replaced with another spare assembly, and the bumper jack 5 actuated through jack lever 17 to lower the automobile back onto the ground ready for driving away. It should be noted at this point that the rearwardly extending portion 4 of bottom plate 3 has been shown moderately short, but same is to be considered as also diagrammatically showing a longer plate which would contact the ground earlier in the jacking process and facilitate the straightening up of the jack receiving pocket earlier in the jacking process and provide added support for the jack which would be of advantage where the ground is sandy or otherwise not as firm as pavement. The actual size used would, of course, be a matter of choice for the manufacturer so as to keep within good operating limits without becoming too bulky or ungainly for storage and carrying in the automobile trunk.

From the foregoing, it will be seen that a novel and advantageous bumper jack helping device has been set forth in the single example illustrated, and which attains the desired ends expeditiously. Nevertheless, attention is invited to the possibility of making variations within the obvious spirit and scope of the invention as illustrated and described, and particularly in connection with the spring and extending arm means which supplies independent axle lifting power to supplement the jacking force of a bumper jack as it independently operates to jack-up an end portion of the automobile.

Other modes of applying the principle of my invention may be employed instead of the one explained, change being made as regards the apparatus herein disclosed, provided the means stated by any of the following claims or the equivalent of such stated means be employed.

I particularly point out and distinctly claim as my invention:

1. A device for applying lifting force to a vehicle axle which is conventionally connected to the vehicle frame by resilient means, said force being independent of the lifting force of a bumper jack or the like when the latter is in position to apply lifting force on said vehicle frame with said jack fully supported on the ground, which comprises a pocket for receiving the bottom of a jack, said pocket having an open top and a closed bottom, a heavy leaf spring, pivot means operably fastening said jack bottom receiving pocket to one end of said spring, a relatively rigid arm means of a length to extend from the second end of said spring to and under said axle, and means rigidly anchoring said second end of said spring to said relatively rigid arm means, wherein when said relatively rigid arm means freely rests on the ground said spring will extend outward and upward from the end of, and in line with, said arm means and with said pocket elevated ready to receive the bottom of said jack, the elevation of said pocket being such that when said jack is operated to force said pocket down until said jack is fully supported in said pocket on the ground, same will elevate the end of said relatively rigid arm means under said axle and apply suitable lifting force on the latter.

2. A device for applying lifting force on a vehicle axle as set forth in claim 1, wherein said relatively rigid arm means includes means for shortening same for compact storage between times of use.

3. A device for applying lifting force on a vehicle axle as set forth in claim 1, wherein said relatively rigid arm means comprises a pair of relatively rigid metal strap members, hinge means joining said metal strap members substantially end to end, and means under said hinge means anchored to and extending from one of said metal strap members under the other to stiffen said rigid arm means, under said hinge, in axle lifting direction while permitting same to be folded for compact transportation.

4. A device for applying lifting force to a vehicle axle, which is conventionally connected to the vehicle frame by resilient means, simultaneously with the independent application of a lifting force to said frame, which comprises an elongated relatively rigid arm means, a heavy leaf spring extending outward and upward from the end of, and in line with, said arm means, means rigidly anchoring the end of said rigid arm means to one end of said spring, a pocket means having an open top and closed bottom suitable for the reception of the lower end of a bumper jack, and means for pivotally joining one side of said pocket means to the end of said spring which is remote from the end of the latter which is rigidly connected to said arm means.

5. A device for applying lifting force to a vehicle axle as set forth in claim 4, wherein said relatively rigid arm means includes means for shortening same for compact storage between times of use.

6. A device for applying lifting force to a vehicle axle as set forth in claim 4, wherein said relatively rigid arm means comprises a pair of relatively rigid metal strap members, hinge means joining said metal strap members substantially end to end, and means under said hinge means anchored to and extending from one of said metal strap members under the other to stiffen said rigid arm means, under said hinge, in axle lifting direction while permitting same to be folded for compact transportation.

7. A device for applying lifting force to a vehicle axle which is conventionally connected to the vehicle frame by resilient means such as springs, with said force when fully applied being independent of the lifting force of a bumper jack or the like used with same but with the latter in position to apply lifting force on said vehicle frame with said jack fully and solidly supported on the ground, which comprises a pocket including means having an open top and a closed bottom portion which extends outward from said pocket to stabilize same in use and provide increased support for said jack, the lower end of which suitably fits in said pocket, a heavy leaf spring which is substantially arcuate in shape and adapted to provide said axle lifting force when substantially straightened out in use, pivot means operably fastening said pocket means at one side thereof to one end of said spring with the open end of said pocket means opening substantially into the same plane as contains the center of curvature of said spring, a relatively rigid arm means of a length to extend from the second end of said spring to and under said axle, said arm means also lying in said plane including the center of curvature of said spring, and means rigidly anchoring said second end of said spring to said relatively rigid arm means, said relatively rigid arm means comprising a pair of relatively rigid metal strap members, hinge means joining said metal strap members substantially end to end, and means under said hinge means anchored to and extending from one of said metal strap members under the other to stiffen said rigid arm means, under said hinge, in axle lifting direction while permitting same to be folded for compact transportation.

References Cited by the Examiner
UNITED STATES PATENTS 3,053,506  9/62  Quinn _____ 254—119

WILLIAM FELDMAN, *Primary Examiner.*